United States Patent Office 3,562,189
Patented Feb. 9, 1971

3,562,189
PROCESS FOR CELLULAR POLYMERS
CONTAINING IMIDE GROUPS
William J. Farrissey, Jr., North Branford, Alexander McLaughlin, Meriden, and James S. Rose, Guilford, Conn., assignors to The Upjohn Company, Kalamazoo, Mich., a corporation of Delaware
No Drawing. Filed June 19, 1967, Ser. No. 647,184
Int. Cl. C08g 22/44, 53/08
U.S. Cl. 260—2.5                                      11 Claims

ABSTRACT OF THE DISCLOSURE

High temperature resistant condensation polymers are prepared in a one-shot procedure by admixing at ambient temperatures polycarboxylic acids or polycarboxylic anhydrides with an organic polyisocyanate in the presence of a dipolar aprotic organic solvent. The use of the latter permits the polymerization to proceed without the need to apply external heat.

BACKGROUND OF THE INVENTION

(1) Field of the invention

This invention relates to a novel process for the production of thermally stable polymers and is more particularly concerned with the preparation of cellular and non-cellular polymers by the reaction of polycarboxylic acids, polycarboxylic acid polyanhydrides, or polycarboxylic acid anhydrides containing free carboxylic acid groups with polyisocyanates at ambient temperatures, and with the polymers so prepared.

(2) Description of the prior art

Methods of preparing polyimides have been described previously. Illustratively, such materials have been prepared in a two-step procedure from a polyamine and a polycarboxylic acid intramolecular anhydride, and in a one-step procedure from a polyisocyanate and a polycarboxylic acid intramolecular anhydride. In the two-step preparation from a polyamine and a polycarboxylic acid anhydride said components are brought together, generally in the presence of an inert solvent, to form an intermediate polyamide-acid.

The latter is then cyclised to form the corresponding polyimide either by heating, for example, at about 200° to 250° C. in accordance with the procedure described in British specification 1,035,428, or by reaction with a monobasic acid anhydride such as benzoic anhydride and the like, in the presence of a tertiary amine catalyst such as pyridine, in accordance with the procedure described in Canadian Patent 736,029.

In the one-step preparation of polyimides from a polyisocyanate and a polycarboxylic acid anhydride it has hitherto been found necessary to bring the components together in the fluid state, which means premelting one or both components, and to heat the reaction mixture at a temperature of at least 230° C. in order to produce the desired polyimide; see, for example U.S. Patent 3,300,420.

Both of the above types of reaction have obvious disadvantages particularly where it is desired to cast the polyimide in place, as in filling construction walls, refrigerator walls and the like, for insulation purposes. In particular, the need to apply external heat in the formation of the polyimide has seriously limited the number of applications for which polyimides, particularly polyimide foams, can be employed.

In a related method of making a composite polyurethane polyimide foam, described in Netherlands applications 6516709 and 6604906, a polycarboxylic acid or anhydride is incorporated into a conventional polyurethane foam producing system. However, it is necessary to subject the resulting foam to high temperature conversion in order to produce a final product having thermal properties approaching those of polyimide foams prepared as described by the above art procedures.

We have now found that, using the novel process of the invention, it is possible to prepare polyimides in a one-step reaction without the need to apply external heat to the reaction. This finding enables the cost of producing such materials to be reduced substantially and greatly extends the range of applications to which these materials can be adapted. Further, it has been found that the process of the invention can be readily adapted for use with high speed mixing machinery commonly employed in the art for mixing and dispensing polyurethane forming reaction mixtures and the like.

BRIEF SUMMARY OF THE INVENTION

The process of the invention, in its broadest aspect, comprises a process for the preparation of high temperature resistant condensation polymers which comprises admixing at ambient temperature in the presence of a dipolar aprotic organic solvent, a polyisocyanate, and a polycarboxylic derivative which contains at least two carboxylic moieties selected from the class consisting of free carboxy groups and anhydride groups.

The term "ambient temperature" as used throughout the specification and claims means the temperature prevailing in the environment in which the process is being carried out. Said temperature is generally within the range of about 15° C. to about 50° C.

DETAILED DESCRIPTION OF THE INVENTION

In carrying out the process of the invention the polyisocyanate (I), as hereinafter defined and exemplified, is brought together with the polycarboxylic derivative (II), as hereinafter defined and exemplified, in the presence of a dipolar aprotic organic solvent, as hereinafter defined and exemplified. The use of said dipolar aprotic organic solvent enables the process to be carried out without the need to apply external heat to the reaction mixture, in contrast to the procedures of the prior art as discussed above.

The amount of dipolar aprotic organic solvent incorporated into the reaction mixture is at least one percent by weight based on the total weight of the reactants. The upper limit of the amount of dipolar aprotic organic solvent employed in the reaction mixture is not critical and is dictated largely by economic factors. A practical upper limit of the amount of dipolar aprotic organic solvent is of the order of about 60 percent by weight based on the total weight of the reactants. Higher proportions of solvent can be employed if desired, particularly in the case of the preparation of non-cellular polymers wherein the dipolar aprotic organic solvent is, in effect, also employed as diluent as will be more fully described hereinafter.

The amount of polyisocyanate employed in the preparation of the high temperature resistant polymers using the process of the invention is at least 0.25 equivalent of isocyanate per equivalent of polycarboxylic derivative. The upper limit of the amount of polyisocyanate employed in the reaction mixture is not critical and again is dictated largely by economic factors. A practical upper limit of polyisocyanate is of the order of about 10 equivalents of polyisocyanate per equivalent of polycarboxylic derivative. Generally speaking however, a proportion of about 0.6 to about 2.0 equivalents of polyisocyanate per equivalent of polycarboxylic derivative is preferred.

The term "equivalent" when employed in reference to the polycarboxylic derivative corresponds to the acid equivalent weight of the compound, i.e. the molecular weight divided by the number of carboxylic acid groups per molecule or, in the case of a polycarboxylic acid intramolecular anhydride, the molecular weight of said anhydride divided by the number of anhydride moieties per molecule.

The solvents which can be employed in accordance with the process of the invention are those defined as dipolar aprotic organic solvents. The term "dipolar aprotic organic solvent" is used throughout this specification and claims in its conventionally accepted sense, namely; as designating a solvent which cannot donate a suitably labile hydrogen atom or atoms to form strong hydrogen bonds with an appropriate species; see, for example, Parker, Quarterly Reviews XVI, 163, 1962. Examples of dipolar aprotic solvents are alkyl alkanoates such as methyl acetate, ethyl acetate, ethyl isobutyrate, hexyl acetate, methyl caproate, ethyl caproate, ethyl isovalerate, ethylene glycol diacetate, 2-ethoxyethyl acetate (Cellosolve acetate) and the like; alkyl esters of aromatic carboxylic acids such as dioctyl phthalate, diisooctyl phthalate, ethyl benzoate, methyl benzoate, and the like; dialkylsulfoxides such as dimethyl sulfoxide, diethyl sulfoxide, diisobutyl sulfoxide, and the like; aliphatic nitriles such as acetonitrile, propionitrile, butyronitrile, valeronitrile and the like; ethers, such as diethyl ether, diisopropyl ether, dibutyl ether, 1,4-dioxane( tetrahydrofuran, dimethyl dioxane, ethylene glycol dimethyl ether, propylene glycol dimethyl ether and the like; nitrated aromatic hydrocarbons such as nitrotoluene, nitrobenzene and the like; N,N-dialkylalkanoamides such as N,N-dimethylformamide, N,N - dimethylacetamide, N,N - diethylacetamide and the like; tetramethylurea; and hexamethylphosphoramide. The preferred dipolar aprotic organic solvents for use in the process of the invention are the dialkyl sulfoxides. The above aprotic organic solvents may be used alone or in combination of two or more.

The polyisocyanate (I) employed in the process of the invention can be any of those polyisocyanates hitherto employed in the art. Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate, 1,5-naphthalene diisocyanate, 1,4-diethylbenzene-β,β'-diisocyanate and other di- and higher polyisocyanates such as those listed in the table of Siefken, Ann. 562, 122–135 (1949). Mixtures of two or more of the above isocyanates can be used, such as mixtures of the 2,4- and 2,6-isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component (I), there can also be used modified forms of these isocyanates. For example there can be used 4,4'-methylenebis(phenyl isocyanate), or an admixture thereof with a minor amount of the 2,4'-isomer, which has been treated to convert a minor proportion, generally less than 15% by weight of the starting material, to an artifact of said starting material. For example, the polyisocyanate component (I) can be methylenebis(phenyl isocyanate) which has been converted to a stable liquid at temperatures of about 15° C. and higher using, for example, the processes described in Belgian Patent 678,773.

Illustrative of another modified form of 4,4'-methylenebis(phenyl isocyanate) which can form the polyisocyanate component (I) is the product obtained by treating the former compound, or mixtures thereof with small portions of the 2,4'-isomer, with a minor portion of a carbodiimide such as diphenylcarbodiimide in accordance, for example, with the procedure described in British Patent 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component (I) a mixture of methylenebis(phenyl isocyanate) with polymethylene polyphenyl isocyanates of higher functionality. Such mixtures are generally those obtained by phosgenation of corresponding mixtures of methylene bridged polyphenyl polyamides. The latter, in turn, are obtained by interaction of formaldehyde, hydrochlroric acid and primary aromatic amines, for example, aniline, o-chloroaniline, o-toluidine and the like. Such polyamines and polyisocyanates prepared therefrom are known in the art, see, for example, U.S. 2,683,730; 2,950,263; 3,012,008, and 3,097,191; Canadian Patent 665,495; and German Patent 1,131,877. Preferred polymethylene polyphenyl polyisocyanates are those containing from about 35% to about 60% by weight of methylenebis(phenyl isocyanate). The polymethylene polyphenyl isocyanate available commercially under the trademark PAPI® is typical of this type of polyisocyanate.

The polycarboxylic derivative (II) employed in the process of the invention contains at least two carboxylic moieties selected from the class consisting of free carboxy groups and anhydride groups. Said polycarboxylic derivatives (II) are inclusive of aromatic, aliphatic, cycloaliphatic or heterocyclic polycarboxylic acids as well as the intramolecular and/or intermolecular anhydrides thereof, provided that, in the case of those anhydrides which contain a single anhydride group there is also present in the molecule at least one free carboxy group. As will be appreciated by one skilled in the art only those polycarboxylic acids which contain carboxy groups attached either to two adjacent carbon atoms or to two carbon atoms which are separated from each other by a single carbon or hetero-atom are capable of forming intra- as opposed to inter-molecular acid anhydrides.

Any of thee aforesaid polycarboxylic acids or anhydrides can be employed as the polycarboxylic derivative (II) in the process of the invention. As will be apparent to the skilled chemist the nature of the recurring units in the resulting polymers will vary according to the structure of the starting polycarboxylic derivative (II).

When the polycarboxylic acid derivative (II) is a dicarboxylic acid which is incapable of forming an intramolecular anhydride, the product formed in accordance with the process of the invention is a polyamide e.g. the product from said dicarboxylic acid and a diisocyanate would contain the recurring unit:

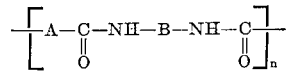

wherein A is the hydrocarbon residue of the dicarboxylic acid starting material and B is the hydrocarbon residue of the disocyanate. On the other hand, when the polycarboxylic derivative (II) is an intromolecular or intermolecular anhydride which contains two or more anhydride moieties or contains one anhydride moiety and free carboxylic acid groups capable of intramolecular or intermolecular anhydride formation, the product of reaction in accordance with the process of the invention is a polyimide e.g. the product of reaction of a diisocyanate and a polycarboxylic acid derivative (II) containing two intramolecular anhydride groups would contain the recurring unit:

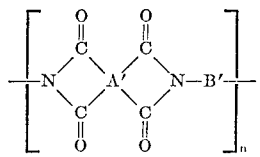

wherein A' is the hydrocarbon residue of the dianhydride and B' is the hydrocarbon residue of the diisocyanate.

Similarly where the polycarboxylic acid derivative (II) contains one or more anhydride groups in addition to a free carboxylic acid group or groups, the polymer resulting from the process of the invention will be a hybrid containing both amide and imide linkages.

All of the above types of polymers can be prepared in accordance with the novel process hereinabove described and all fall within the scope of this invention. Thus, by appropriate choice of the polycarboxylic acid derivative (II) it is possible to prepare any of a wide variety of polymers using the single step process of the invention.

Examples of polycarboxylic derivatives (II) which can be employed as the free carboxylic acids or as intermolecular anhyrides formed from the same or different acids are: isophthalic acid, terephthalic acid, trimesic acid and phthalic acid. Examples polycarboxylic derivatives (II) which can be employed as the free carboxylic acids or intramolecular anhydrides thereof, are:

trimellitic acid and the anhydride thereof,
pyromellitic acid and the dianhydride thereof,
mellophanic acid and the anhydride thereof,
benzene-1,2,3,4-tetracarboxylic aicid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof, and
benzophenone-3,3',4,4'-tetracarboxylic acid and the dianhydride thereof.

Other anhydrides which may be employed in the practice of the invention are: the intermolecular anhydride of trimellitic acid 1,2-anhydride (see, for example U.S. 3,155,687), the bis-anhydrides disclosed in U.S. 3,277,117 [e.g. 4,4'-ethylene glycol bis-anhydro trimellitate and 4,4'-(2-acetyl-1,3-glycerol) bis-anhydro trimellitate] and the di-adducts of maleic acid or anhydride with styrene.

While any of the polycarboxylic acids and intramolecular or intermolecular anhydrides thereof defined and exemplified above can be employed in the preparation of the polymers of the invention a preferred group of compounds for this purpose are intramolecular anhydrides which are derived from polycarboxylic acids having at least 3 carboxyl groups of which at least two carboxyl groups are attached directly to an aromatic nucleus in ortho-position with respect to each other. A particularly preferred group of polycarboxylic acid intramolecular anhydrides are those selected from the class consisting of anhydrides having the following formulae:

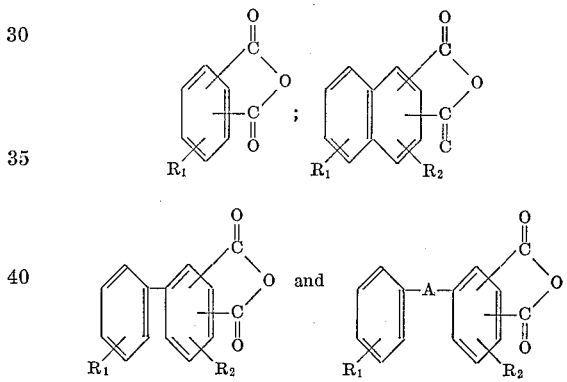

wherein at least one of $R_1$ and $R_2$ represents a group selected from the class consisting of carboxyl and the group

wherein the carbon atoms of the latter are each attached to adjacent carbon atoms in an aromatic ring, and wherein $R_1$ and $R_2$ additionally represent from 0 to 3 substituents selected from the group consisting of halogen and lower-alkyl and A is a bridging group selected from the class consisting of lower-alkylene, carbonyl, sulfonyl and oxygen.

The term "lower-alkyl" means alkyl containing from 1 to 6 carbon atoms, inclusive, such as methyl, ethyl, propyl, butyl, pentyl, hexyl, and isomeric forms thereof. The term "halogen" means flourine, chlorine, bromine and iodine. The term "lower-alkylene" means alkylene containing from 1 to 6 carbon atoms, inclusive, such as methylene, ethylene, 1,3-propylene, 1,4-butylene, 2,3-butylene, 1,6-hexylene and the like.

The process of the invention can be applied to the preparation of both cellular and non-cellular materials. Thus, as will be appreciated by a chemist skilled in the art, the reaction of the polyisocyanate (I) and the polycarboxylic derivative (II) gives rise to the elimination of carbon dioxide. The carbon dioxide can, if desired, be removed from the reaction mixture as it is produced and, in the absence of any other added blowing agent, the reaction product will be non-cellular.

In preparing non-cellular products in accordance with the invention, said polyisocyanate (I) and polycarboxylic derivative (II) are added, in any convenient manner, either separately or in combination, to the dipolar aprotic organic solvent, in a suitable mixing vessel, preferably under an inert atmosphere. The dipolar aprotic solvent is advantageously employed in an amount of at least about 100% by weight based on the total weight of the reactants. The upper limit of proportion of dipolar aprotic organic solvent in this instance is dependent purely on economic factors. The solvent is generally employed in excess in the preparation of the non-cellular products and serves both as catalyst and as diluent. The reaction of the polyisocyanate (I) and polycarboxylic derivative (II) proceeds at ambient temperatures and pressures and is generally exothermic in nature. The desired polyimide can be isolated in various ways which will be obvious to one skilled in the art. Thus, if the reaction mixture is allowed to remain undisturbed, the desired polyimide will separate from solution. Said precipitate is generally in finely divided form and can be readily isolated, freed from solvent, and used for molding of high temperature resistant articles. The molding is carried out conveniently using techniques conventionally employed in molding powdered metals, such as by sintering or hot pressing; see, for example, "Encyclopedia of Chemical Technology" edited by Kirk and Othmer, Interscience Encyclopedia Inc., vol. 11, pp. 54–5, New York (1953).

Alternatively, the above reaction mixture can be cast, prior to the point at which precipitation occurs, on to a suitable substrate such as an open tray. Removal of the solvent from the cast product, e.g. by evaporation under reduced pressure, leaves the desired polyimide in solid form. The resulting polymer can, if desired, be machined or otherwise fabricated to form articles having high thermal stability. Alternatively, the cast polymer can be chopped or ground to a finely powdered condition for use in molding articles having high thermal stability using, for example, the procedures described above.

In preparing high temperature resistant cellular products of the invention, the polyisocyanate (I), the polycarboxylic derivative (II) and the dipolar organic solvent are brought together under foam producing conditions using additional blowing agents, if desired, and like adjuvants commonly employed in the related art of preparing polyurethane foams. A prepolymer technique can be employed, if desired, e.g. by first reacting the polyisocyanate with a portion of the polycarboxylic derivative and subjecting the isocyanate-terminated prepolymer to foaming. Preferably a one shot procedure is employed i.e. all the reactants are brought together into the foam reaction mix. The order or manner in which the reactants are mixed in the one shot procedure is not critical. However, it is preferred that the polycarboxylic derivative (II) be preblended with the polyisocyanate (I) and that the blend so obtained be admixed with the dipolar aprotic organic solvent and other adjuvants to form the foam reaction mixture. The mixing of the various reaction components can be carried out by hand when operating on the small scale but is advantageously carried out using the various mixing and dispensing machines conventionally employed in the manufacture of polymer foams; see, for example, Ferrigno, "Rigid Plastic Foams" Reinhold Publishing Corp., New York, pp. 51–61 (1963).

In employing the process of the invention for the preparation of cellular polymers, it has been found advantageous, in order to obtain foams having particularly desirable properties, to incorporate in the foam reaction mixture a minor amount (as defined hereinafter) of an adjuvant (III) which contains at least 2 groups containing active hydrogen atoms. The term "group containing an active hydrogen atom" as used throughout this specification is employed in its conventional sense of designating a group which gives a positive reaction in the Zerewitinoff reaction, J. Am. Chem. Soc., 49, 3181, 1927. Such groups are inclusive of primary and secondary hydroxyl groups, primary amino groups, carboxylic groups and the like.

The adjuvants (III) are inclusive of polyols, polyamines and hydroxyamines such as those conventionally employed as polyfunctional active hydrogen containing compounds in the closely related polyurethane art. Said adjuvants (III) advantageously are those having equivalent weights (i.e. molecular weight divided by the number of active hydrogen containing groups) from about 30 to about 3000 and having from about 2 to about 8 active hydrogen containing groups per molecule.

Illustrative of polyols which can be used as the adjuvant (III) in preparing foams in accordance with the process of the invention are polyethers such as polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethyleneoxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear dihydroxy benzene, e.g., catechol, resorcinol, hydroquinone, orcinol, 2,2-bis(hydroxyphenyl)propane, bis(p - hydroxyphenyl)methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or alkyl glycosides, e.g. the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol, polyols containing a heterocyclic nucleus such as 3,3,5 - tri(hydroxymethyl)-5-methyl-4-hydroxytetrahydropyran and 3,3,5,5-tetrakis(hydroxymethyl) - 4 - hydroxytetrahydropyran, or polyols containing an aromatic nucleus such as 2,2-bis-(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g. 1,1,3,3 - tetrakis(hydroxy-3-methylphenyl)propanes, 1,1,4,4-tetrakis(hydroxyphenyl)butanes, and the like.

Particularly useful polyols for employment in the process of the invention are those polyols containing tertiary nitrogen such as: (a) a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 30 to 90 parts of methylene dianilines, the remaining parts being triamines and polyamines of higher molecular weight, said methylene dianilines, triamines, and polyamines of higher molecular weight having been formed by acid condensation of aniline and formaldehyde, (b) a polyol obtained by the Mannich condensation of a phenolic compound with formaldehyde and an alkanolamine, and the alkylene oxide adducts thereof, see, for example, U.S. 3,297,597, (c) hydroxyalkylated aliphatic diamines such as N,N,N',N'-tetrakis (2-hydroxypropyl)ethylenediamine, (d) hydroxyalkylated isocyanuric acid such as tris-(2-hydroxyethyl)isocyanurate, and the like.

The organic polyamines employed as the adjuvant (III) in making cellular products of the invention include aromatic, aliphatic, cycloaliphatic, or heterocyclic polyamines and are preferably those which have amine equivalent weights within the range of approximately 30 to approximately 200.

Illustrative of said organic polyamines are: the polymethylene polyphenylamine mixtures, particularly those containing from 30 to 90 parts of methylene dianilines, the remaining parts being triamines and polyamines of higher molecular weight, said mixtures being made by the condensation of aniline and formaldehyde in the presence of hydrochloric acid using, for example, the procedures described in U.S. Pats. 2,683,730 and 2,950,263;

m-phenylene diamine,
p-phenylene diamine,
4,4'-diamino diphenyl propane,
4,4'-diamino diphenyl methane,
benzidine,
4,4'-diamino diphenyl sulfide,
4,4'-diamino diphenyl sulfone,
3,3'-diamino diphenyl sulfone,
4,4'-diamino diphenyl ether,
2,6-diamino pyridine,
bis-(4-amino phenyl)-N-methylamine,
1,5-diamino naphthalene,
3,3'-dimethyl-4,4'-diamino biphenyl,
3,3'-dimethoxy benzidine,
2,4-bis($\beta$-amino-t-butyl)toluene,
3,3'-dichlorobenzidine,
4,4'-methylene bis(2-chloroaniline)
2,3',5'-trichloro-4,4'-methylene dianiline,
bis-(p-$\beta$-amino-t-butyl phenyl)ether,
p-bis-(2-methyl-4-amino pentyl)benzene,
p-bis-(1,1-dimethyl-5-amino pentyl)benzene,
m-xylylene diamine,
p-xylylene diamine,
ethylene diamine,
triethylene tetraamine,
tetraethylene pentylamine,
pentaethylene hexamine,
hexamethylene diamine,
heptamethylene diamine,
octamethylene diamine,
nonamethylene diamine,
decamethylene diamine,
3-methyl-heptamethylene diamine,
4,4-dimethyl-heptamethylene diamine,
2,11-diamino dodecane,
1,2-bis-(3-amino propoxy)ethane,
2,2'-dimethyl propylene diamine,
3-methoxy hexamethylene diamine,
2,5-dimethyl hexamethylene diamine,
2,5-dimethyl heptamethylene diamine,
5-methyl nonamethylene diamine,
1,4-diamino cyclo hexane,
1,12-diamino octadecane,
2,5-diamino-1,3,4-oxadiazole, and the like.

Mixtures of any of the above polyamides may be used.

The hydroxyamines employed as adjuvant (III) in making cellular products in accordance with the invention are preferably those having equivalent weights from about 30 to about 150. Illustrative of said hydroxyamines are alkanolamines such as ethanolamine, isopropanolamine, butanolamine, hexanolamine, and the like, N-hydroxyalkyl alkylenediamines such as N-hydroxyethyl ethylenediamine, N-hydroxymethylethylenediamine and the like and hydroxyalkyl aminoalkyl ethers such as 2-hydroxyethyl, 2-aminoethyl ether, 2-hydroxypropyl, 2-aminoethyl ether, and the like.

Any of the above adjuvants (III) can be used alone or in combination with one or more different adjuvants provided that the overall functionality and equivalent weight falls within the limits hereinbefore defined.

In carrying out the "one shot" process of the invention the amount of adjuvant (III) incorporated into the polymer reaction mix is advantageously at least 0.010 equivalent per equivalent of polyisocyanate. The upper limit of the amount of adjuvant (III) employed in the reaction mixture is not critical and is, like the upper limit of the polyisocyanate and dipolar aprotic solvent, dictated largely by economic factors. A practical upper limit of the amount of adjuvant (III) is of the order of about 0.50 equivalent per equivalent of polyisocyanate. Preferably the adjuvant (III) is employed in an amount of from about 0.02 to about 0.5 equivalent per equivalent of polyisocyanate. It is to be understood that, even when employing the adjuvant (III) in the reaction process of the invention, the proportion of polycarboxylic derivative (I) to polyisocyanate (II) remains within the limits discussed previously. The adjuvant (III) as hereinabove defined may be added to the reaction mix as a separate component or as a preformed mixture with one or more of the other components of the reaction mix. As hereinbefore discussed, we have found it to be most convenient and economical to first blend the adjuvant (III) with the dipolar aprotic organic solvent at ambient temperatures prior to admixing with the preformed mixture of polycarboxylic derivative and polyisocyanate component.

It is well-known in the art that the condensation reaction of polyisocyanates with polycarboxylic derivatives results in elimination of carbon dioxide; see, Saunders et al., ibid, p. 186. This evolved carbon dioxide can behave as an in situ foaming agent resulting in low density, high temperature resistant cellular products. If lower density product are desired other extraneously added foaming agents may be employed in the preparation of cellular products in accordance with the novel process of the invention.

Illustrative of said foaming agents are water (which generates carbon dioxide by reaction with isocyanate) and volatile solvents such as the lower molecular weight aliphatic hydrocarbons, namely those having boiling points of from about $-40°$ to about $200°$ C., preferably from about $-20°$ to about $115°$ C., for example, difluorochloromethane, trichloromonofluoromethane, dichlorodifluoromethane, chlorotrifluoromethane, 1,1 - dichloro-1-fluoroethane, 1 - chloro-1,1-difluoro - 2,2 - dichloroethane, and 1,1,1-tribromo - 2 - chloro-2-fluorobutane, and the like. If desired, a mixture of water and one or more of said volatile solvents can be used as a foaming agent.

In preparing polymers according to the process of the invention, it is optional to employ co-catalysts. These cocatalysts can be any of the catalysts conventionally employed in the catalysis of the reaction of an isocyanate with a reactive hydrogen containing compound; see, Saunders et al., ibid, Part I, pp. 228–232, see also Britain et al., "J. Applied Polymer Science," 4, 207–211, 1960.

Illustrative of catalysts which can be employed in the formation of cellular foams in accordance with the invention are organic and inorganic acid salts and organometallic derivatives of: bismuth, lead, tin, iron, antimony, zinc, cadmium, mercury, uranium, cobalt, thorium, aluminum, nickel cerium, molybdenum, vanadium, copper, manganese, and zirconium, as well as phosphines and peroxides. The preferred cocatalysts for use in the process and compositions of the invention are the tertiary organic amines of which the following are representative: triethylamine, triethylenediamine and derivatives thereof, N,N,N',N'-tetramethylethylenediamine, N,N,N',N'-tetraethylethylene diamine, N-methylmorpholine, N-ethylmorpholine, N,N,N',N'-tetramethylguanidine, N,N,N',N' - tetramethyl-1,3-butanediamine, N,N-dimethylethanolamine, N,N-diethylethanolamine, and the like, or mixtures of two or more such amines.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene-ether glycol may be used, if desired, to obtain better dispersion of the components of the foam mixture.

Additives such as dyes, pigments, soaps and metallic powders and other inert fillers may be added to the foam mixture to obtain special foam properties in accordance with practices well-known in the art.

The polymers of this invention possess markedly superior high temperature resistance as compared with the polymers that are presently commercially available and are capable of retaining their strength and structural self-support at temperatures in excess of about 250° C. for extended periods of time and in many cases at temperatures as high as 550° C. In this respect it is to be noted that, in order to achieve the optimum flame resistance and thermal stability in the products of the invention, particularly the cellular products, it is necessary to ensure that all traces of the aprotic solvent employed in the process of the invention have been removed from the resulting product. This can be accomplished readily by heating the product for a short period at a temperature above the boiling point of said solvent and, if desired, at a pressure lower than atmospheric.

The polymers of the invention can be employed for a variety of purposes. Illustratively, the non-cellar products may be shaped, for example, by machining from billets, by punching or by making use of powdered metal techniques, into articles such as grinding wheels, friction devices such as brakes and clutches, or they may be used as coating compositions. Said coating compositions may be used as impregnating resins or applied to various substrates, such as metals, wires, woven fabric or even to other polymeric materials. The cellular products of the invention can be employed for all the purposes for which the currently produced commercial cellular products are conventionally employed. For example, the cellular products of the invention can be employed as thermal barriers in the construction of wire walls in the building of industrial and institutional structures (e.g. schools, hospitals, etc.) and as insulating materials for high temperature pipe lines and ovens, in supersonic aircraft and also as missile components. As previously pointed out, the novel process of the invention enables cellular products of the above type to be poured-in-place much more readily and economically than previous methods described for the preparation of polyimide and like foams. Thus the process of the invention does not require the application of external heat in order to effect the polymer formation nor does it require the heating of molds, cavity walls, and the like, to high temperatures.

Further it has been found unexpectedly that the process of the invention can be carried out readily using conventional types of polymer mixing and dispensing machines, particularly those conventionally employed in the metering and dispensing of multiple components in the related art of formation of polyurethane foams. This finding is particularly surprising in that one of the reaction components of the process of the invention, namely the polycarboxylic derivative (II) is generally employed as a solid. Despite this, said component can be made to flow, advantageously by prior blending with polyisocyanate or aprotic organic solvent, to such an extent that it can be dispensed using the aforesaid mechanical equipment without any significant modification of the latter.

The following examples describe the manner and process of making and using the invention and set forth the best mode contemplated by the inventors of carrying out the invention but are not to be construed as limiting.

EXAMPLE 1

A high temperature resistant, polyimide cellular polymer of the invention was prepared as follows:

A mixture of 161 parts by weight (1.00 equivalent) of 3,3',4,4'-benzophenone tetracarboxylic dianhydride and 132 parts by weight (1.00 equivalent of polymethylene polyphenyl isocyanate (equivalent weight=133) was prepared by mechanical blending. To this fluid mixture was added a mixture of 50 parts by weight (0.473 equivalent) of a polyol of equivalent weight 105.6 (the adduct of propylene oxide and a mixture of polyamines containing 50% by weight of methylenedianiline obtained by the acid condensation of aniline and formaldehyde), 150 parts by weight of dimethyl sulfoxide and 10 parts by weight of (a block co-polymer of a dimethylpolysiloxane and polyethylene oxide surfactant. These mixtures were mechanically blended for 10 seconds at room temperature (circa 20°–30° C.) and poured rapidly into a wooden mold (14" x 6" x 4") and allowed to expand freely at room temperature. After approximately 10–15 minutes, the resultant cellular product was very rigid with a fine uniform cell structure. The residual solvent was removed from the resultant foam by placing it in a 100° C. oven for 4 days. The following physical properties of the resulting dried foam were measured using the procedures set forth in the manual of "Physical Test Procedures of the Atlas Chemical Industries, Inc." unless otherwise stated.

Foam A

Density, p.c.f. _____ 2.82
Compressive strength, p.s.i. (parallel to rise) ____ 30.2
Flame test (ASTM D 1692–59T); total inches
 burned _____ 0.1
Classification _____ Non-burning An infrared spectra of theabove foam, before drying, showed strong imide absorption at 5.60, 5.80 and 7.24 microns. The test sample of the above dried foam which was subjected to the ASTM D1692–59T flame test retained its cellular structure in the portion charred by the flame with no apparent emission of smoke or flame spreading under the conditions of the test.

EXAMPLE 2

A high temperature resistant polyimide cellular polymer was prepared in accordance with the process of the invention using the ingredients and proportions set forth in Table I employing a foam metering and dispensing modulating unit having a diamond cross-cut impeller rotating at 5,000 r.p.m. (Martin Sweets Co., Inc., Louisville, Ky.).

The foam ingredients were dispensed at approximately 15 pounds per minute having been metered and mixed as two separate streams. One stream (component A) comprised a mixture of the polyisocyanate and the polycarboxylic derivative. The second stream (component B) was made up of the dipolar aprotic solvent, the polyol and the surface active agent. The physical properties of the resultant foam (after drying at 110° C. for 4 days) were determined using the test procedures of Example 1.

Table I

Ingredients (foam B):
  Component A:
    3,3',4,4'-benzophenone tetracarboxylic dianhydride _____ parts by weight __ 161
    Polymethylene polyphenyl polyisocyanate _____ parts by weight __ 196
  Component B:
    Dimethyl sulfoxide _____ do ____ 150
    Polyol [1] _____ do ____ 50
    Surfactant used in Example 1 _____ do ____ 10

[1] The polyol employed in this example was obtained following the procedures set forth in U.S. 3,297,597 by Mannich condensation of nonylphenol, diethanolamine and formaldehyde followed by the addition of propylene oxide. The resultant polyol had a hydroxyl equivalent weight of 110.

Table I—Continued

Feed temperatures:
  Component A _____° F__ 80
  Component B _____° F__ 73
  Room temperature _____° C__ 68
Cream time _____sec__ 25
Rise time _____ 3 min. 5 sec.
Physical properties of foam:
  Density, p.c.f. _____ 2.82
  Compressive strength, p.s.i.:
    (Parallel to rise) _____ 22.9
    (Perpendicular to rise) _____ 30.1
  Flame test (ASTM D1692–59T) maximum
    inches burned _____ 0.2
Classification _____ Non-burning Infrared spectra of the resultant foam, before drying, showed strong imide absorption peaks at 5.60, 5.80 and 7.24 microns.

EXAMPLE 3

A series of heat resistant polyimide foams of the invention was prepared using the procedure set forth in Example 1 and employing the reactants (all parts given by weight) set forth in Table II. The physical properties of the resulting foams (after drying at 100° C. for 4 days) were determined using the test procedures set forth in Example 1.

TABLE II

| Materials | Foams | | | |
|---|---|---|---|---|
| | C | D | E | F |
| 3,3',4,4'-benzophenone tetracarboxylic dianhydride | 161 | 161 | 161 | 161 |
| Polymethylene polyphenyl polyisocyanate | 196 | 281 | 209 | 224 |
| Dimethyl sulfoxide | 150 | 250 | 150 | 250 |
| Surfactant used in Ex. 1 | 10 | 10 | 2 | 10 |
| Organosilicone surfactant | | | 10 | |
| 33% triethylene diamine in dipropylene glycol | 5 | | | |
| Sucrose propylene oxide based polyol, eq. wt.=105 | 50 | | | |
| Trimethylol propane | | 50 | | |
| Tris (β-hydroxyethyl) isocyanurate | | | 50 | |
| N,N,N',N'-tetrakis (2-hydroxypropyl) ethylene diamine | | | | 50 |
| Density, p.c.f. | 4.06 | 2.84 | 2.75 | 6.22 |
| Compressive strength, p.s.i. (parallel to rise) | 63.2 | 38.6 | 33.1 | 120.3 |
| Flame test (ASTM D1692–59T): | | | | |
| Maximum inches burned | 0.5 | 0.3 | 0.1 | 0.3 |
| Minimum inches burned | 0.1 | 0.2 | 0.1 | 0.1 |
| Classification | Non-burning | | | |

EXAMPLE 4

A thermally stable polyimide cellular product was prepared according to the procedure set forth in Example 1 employing FREON 11-B (modified trichlorofluoromethane, Du Pont) as an auxiliary foaming agent and using the reactants set forth in Table III (all parts by weight). The physical properties of the resulting foam (after drying at 100° C. for 4 days) were determined using the procedures of Example 1.

Table III

Foam G 3,3',4,4'-benzophenone tetracarboxylic
  dianhydride _____ 161
Polymethylene polyphenyl polyisocyanate _____ 225
Surfactant used in Ex. 1 _____ 10
Trichlorofluoromethane _____ 50
Dimethyl sulfoxide _____ 50
N,N,N',N'-tetrakis(2-hydroxypropyl)
  ethylene diamine _____ 50
Density, p.c.f. _____ 3.70
Compressive strength, p.s.i. (parallel to rise) _____ 24.4
Flame test (ASTM D1692–59T):
  Maximum inches burned _____ 0.2
  Minimum inches burned _____ 0.1
Classification _____ Non-burning

EXAMPLE 5

A high density heat resistant polyimide cellular polymer was prepared according to the procedure of Example 1 using the reactants set forth in Table IV (all parts by weight). The physical properties of the foam were determined, after drying 4 days at 100° C., using the test procedures specified in Example 1.

Table IV

Foam H 3,3',4,4'-benzophenone tetracarboxylic
  dianhydride _____ 161
Polymethylene polyphenyl polyisocyanate _____ 196
Dimethyl sulfoxide _____ 50
N,N,N',N'-tetrakis(2-hydroxypropyl)
  ethylene diamine _____ 35
Density, p.c.f. _____ 18.6
Compressive strength, p.s.i.:
  (Parallel to rise) _____ 1344
  (Perpendicular to rise) _____ 1254
Flame test (ASTM D1692–59T):
  Maximum inches burned _____ 0.1
  Minimum inches burned _____ 0.1
Classification _____ Non-burning

EXAMPLE 6

A series of heat resistant polyimide foams employing the process of the invention was prepared using the procedure set forth in Example 1 and employing the reactants set forth in Table V. These foams were of varying density and characterized as having uniform fine cell structures.

TABLE V

| | Foams | | | |
|---|---|---|---|---|
| | I | J | K | L |
| 3,3',4,4'-benzophenone tetracarboxylic dianhydride | 161 | 161 | 161 | 161 |
| Polymethylene polyphenyl polyisocyanate | 225 | 225 | 225 | 225 |
| Dimethyl formamide | 150 | | | |
| Dioctyl phthalate | | 150 | | |
| Dimethyl acetamide | | | 150 | |
| Hexamethyl phosphoramide | | | | 150 |
| Polyol ¹ | 50 | 50 | 50 | 50 |
| Surfactant used in Ex. 1 | 10 | 10 | 10 | 10 |

¹ Polyol of Example 2.

EXAMPLE 7

A high temperature resistant polyimide cellular product was prepared using the procedure set forth in Example 1 and employing the reactants set forth in Table VI (all parts by weight).

The isocyanate employed in the preparation of this foam was modified methylenebis (phenyl isocyanate) [equivalent weight 143.3; prepared by heating methylenebis (phenyl isocyanate) containing 94% 4,4'-isomer and 6% 2,4'-isomer with 3% by weight of triethylphosphate at 220° C. for 3 hours before cooling to approximately 70° C.]. Physical properties of the resultant foam were determined, after drying for 4 days at 110° C., using the test procedures specified in Example 1.

Table VI

Foam M 3,3',4,4'-benzophenone tetracarboxylic
  dianhydride _____ 161
Polyisocyanate _____ 300
Dimethyl sulfoxide _____ 150
N,N,N',N'-tetrakis (2-hydroxypropyl)ethylene
  diamine _____ 50
Organosilicone surfactant _____ 10
33% triethylene diamine in dipropylene glycol ___ 10
Density, p.c.f. _____ 4.58
Compressive strength, p.s.i.:
  (Parallel to rise) _____ 44.7
  (Perpendicular to rise) _____ 64.7

The infrared spectra of the resultant foam, before removal of the solvent, showed strong imide absorption peaks at 5.60, 5.80, and 7.24 microns.

Using the procedures as set forth in Examples 1 through 7 but replacing the 3,3′,4,4′-benzophenone tetracarboxylic dianhydride with an equivalent amount of trimellitic acid, or the anhydride thereof, pyromellitic acid, or the dianhydride thereof, cyclopentane-1,2,4,5-tetracarboxylic acid or the dianhydride thereof or benzene-1,2,3-tricarboxylic acid or the anhydride thereof, there are obtained the corresponding high temperature resistant cellular products of the invention.

EXAMPLE 8

A high temperature resistant polyimide cellular product was prepared using the procedure set forth in Example 1, except that the ingredients were mixed and allowed to foam in an 8 oz. paper cup, employing the reactants set forth in Table VII (all parts given by weight). The resultant foam was characterized by fine, uniform cells and a density of approximately 11 pounds per cubic foot.

Table VII

| | Foam N |
|---|---|
| 3,3′,4,4′-benzophenone tetracarboxylic dianhydride | 16.0 |
| Polymethylene polyphenyl polyisocyanate | 13.2 |
| Dimethyl sulfoxide | 5.0 |
| Surfactant used in Ex. 1 | 1.0 |
| 33% Triethylene diamine in dipropylene glycol | 0.25 |

EXAMPLE 9

A high temperature resistant non-cellular polyimide polymer of the invention was prepared as follows:

Five hundred grams of dimethyl sulfoxide and 129 grams (0.801 equivalent of 3,3′,4,4′-benzophenone tetracarboxylic dianhydride were charged to a 1000 ml. round bottom, three neck flask equipped with a magnetic stirring bar and thermometer. One hundred twelve grams (0.895 equivalent) of 4,4′-methylenebis (phenyl isocyanate) were added with stirring while the mixture was maintained under an inert atmosphere. All the ingredients were initially at ambient temperature (circa 20° C.). The reaction mass was allowed to exotherm to 47° C. at which time the reaction mass became cloudy. A portion of the reaction mass was cast on to a flat glass plate and vacuum dried at 80° C. The resultant polyimide heat resistant film was a tough, clear, amber colored polymer; the infrared spectrum thereof exhibited absorption peaks at 5.60, 5.80, and 7.24 microns. The remaining portion of the reaction mass was allowed to remain at ambient temperature until a precipitate formed. The solid polyimide which separated was isolated by filtration and dried; the infrared spectrum thereof exhibited strong absorption peaks at 5.60, 5.80, and 7.24 microns. This material, which does not melt at 500° C., can be processed by powdered metal techniques into finished parts. The heat resistant fabricated parts are characterized as having excellent frictional performance and good wear resistance at high temperature.

EXAMPLE 10

A high temperature resistant polyamide foam was prepared using the following ingredients and proportions (all parts by weight).

Eighty four parts by weight (1.00 equivalent) of terephthalic acid, 171 parts (1.285 equivalents) of PAPI® and 10 parts of organosilicone surfactant were mechanically blended. To this mixture was added, at room temperature, a preformed blend of 100 parts of dimethyl sulfoxide, and 30 parts (0.412 equivalent) of N,N,N′,N′-tetrakis(2-hydroxypropyl) ethylene diamine. This admixture was mechanically blended for approximately 5–10 seconds, then poured into a suitable mold and allowed to rise freely at ambient temperature (circa 25°–30° C.). The resultant foam "O" was characterized by a fine, uniform cell structure and had a density of approximately 2.54 pounds per cubic foot. The infrared spectrum of the resultant polyamide foam showed strong amide absorption at 5.94 microns.

EXAMPLE 11

Heat resistant rigid cellular products were prepared according to the procedure set forth in Example 6, except the ingredients were mixed and allowed to foam in 32 oz. paper cups, employing the reactants set forth in Table VIII (all parts given by weight). The physical properties of the resulting foams were determined (after drying at 100° C. for 4 days), using the test procedures of Example 1.

TABLE VIII

| | Foam P | Foam Q |
|---|---|---|
| Terephthalic acid | 8.4 | |
| Isophthalic acid | | 8.4 |
| Polymethylene polyphenyl polyisocyanate | 27.1 | 27.1 |
| Dimethyl sulfoxide | 10 | 10 |
| N,N,N′,N′-tetrapis (2-hydroxypropyl) ethylene diamine | 3 | 3 |
| Trichlorofluoromethane | 3 | 3 |
| Organosilicone surfactant | 1 | 1 |
| 33% triethylene diamine in dipropylene glycol | 1 | 1 |
| Di-t-butyl peroxide | 0.5 | 0.5 |
| Density, p.c.f. | 4.84 | 3.13 |
| Compressive strength, p.s.i. (parallel to rise) | 42.7 | 15.8 |
| Flame test (ASTM D1692–59T): | | |
| Maximum inches burned | 1.10 | 1.80 |
| Minimum inches burned | 0.70 | 0.95 |

EXAMPLE 12

A high temperature resistant cellular polyamide was prepared using the procedure set forth in Example 10 and employing the reactants of Table IX (all parts given by weight).

The physical properties of the resultant foam "R" was determined, after drying at 110° C. for 4 days, using the test procedures of Example 1.

Table IX

| | Foam R |
|---|---|
| Terephthalic acid | 84 |
| Polymethylene polyphenyl polyisocyanate | 210 |
| Dimethyl sulfoxide | 150 |
| Polyol [1] | 50 |
| Organosilicone surfactant | 10 |
| Density, p.c.f. | 7.31 |
| Compressive strength, p.s.i.: | |
| (Parallel to rise) | 121.4 |
| (Perpendicular to rise) | 118.7 |
| Flame test (ASTM D1692–59T): | |
| Maximum inches burned | 1.1 |
| Minimum inches burned | 0.4 |

[1] Polyol of Example 2.

EXAMPLE 13

Using the procedure of Example 9, but replacing the polyisocyanate there used by an equivalent amount of a mixture containing 80 parts by weight, of 2,4-tolylene diisocyanate and 20 parts by weight of 2,6-tolylene diisocyanate there is obtained the corresponding non-cellular polyimide.

Similarly, using the procedure of Example 9, but replacing the polyisocyanate there used by an equivalent amount of dianisidine diisocyanate, tolylene diisocyanate, hexamethylene diisocyanate, 1,5-naphthalene diisocyanate, 1,4-diethylbenzene-β, β′-diisocyanate, isophorone diisocyanate, p-methane diisocyanate, m-xylylene diisocyanate, methylene bis(4-isocyanato cyclo hexane), tolidine diisocyanate, or a diisocyanate of the formula OCN−(D)−NCO where D is a 36 carbon aliphatic hydrocarbon radical (DDI®), there are obtained the corresponding non-cellular polyimides.

EXAMPLE 14

Using the procedure described in Example 9, but replacing the 3,3′,4,4′-benzophenone tetracarboxylic acid dianhydride by the equivalent amount of benzene-1,2,3,4-tetracarboxylic acid or the dianhydride thereof, there is obtained the corresponding non-cellular polyimide.

Similarly, using the procedure descirbed in Example 9, but replacing the 3,3',4,4'-benzophenone-tetracarboxylic acid dianhydride by diphenyl-3,3',4,4'-tetracarboxylic acid, naphthalene-2,3,6,7-tetracarboxylic acid, bis(2,3-dicarboxyphenyl) methane, bis(3,4-dicarboxyphenyl)sulfone, bis(3,4-dicarboxyphenyl)ether, or the dianhydrides of any said acids, there are obtained the corresponding non-cellular polyimides.

EXAMPLE 15

A high temperature resistant polyimide foam was prepared using the following ingredients and proportions (all parts by weight):

A mixture of 16.1 parts (0.1 equivalent) of 3,3',4,4'-benzophenone tetracarboxylic dianhydride and 23.6 parts (0.178 equivalent of polymethylene polyphenyl polyisocyanate was prepared by mechanical blending. To this mixture was added, at room temperature (circa 25° C.) a preformed blend of 10 parts of dimethyl sulfoxide, 10 parts (0.0793 equivalent) of 3,3'-dichlorobenzidine and 1 part of the surfactant used in Ex. 1. This admixture was mechanically blended in a 32 oz. paper cup for approximately 5–10 seconds and allowed to foam freely at ambient temperatures in the mixing container. The resultant foam "S" was characterized by very fine uniform cell structure, a density of 3.92 pounds per cubic foot and infrared absorption peaks at 5.60, 5.80, and 7.24 microns.

EXAMPLE 16

Employing the procedure described in Example 15, but replacing the 3,3'-dichlorobenzidine with an equivalent amount of 4,4'-methylene bis(2-chloroaniline) there is obtained the corresponding high temperature resistant polyimide cellular polymer.

Similarly, using the procedure of Example 15, but replacing the 3,3'-dichlorobenzidine with an equivalent amount of 2,3',5'-trichloro-4,4'-diamino diphenyl methane or 3,3'-dimethoxybenzidine, there are obtained the corresponding high temperature resistant polyimide foams.

EXAMPLE 17

A high temperature resistant polyimide foam was prepared using the following ingredients and proportions (all parts by weight):

A mixture of 16.1 parts (0.1 equivalent) of 3,3',4,4'-benzophenone tetracarboxylic dianhydride and 27.6 parts (0.207 equivalent) of polymethylene polyphenyl polyisocyanate was prepared by mechanical blending. To this mixture was added, at room temperature (circa 25° C.), a preformed blend of 15 parts of dimethyl sulfoxide, 10 parts of 4,4'-methylene bis(2-chloroaniline) (0.075 equivalent), 1 part of the surfactant used in Ex. 1 and 2 parts (0.019 equivalent) of polymethylene polyphenylamine mixture having an equivalent weight of 103 and containing 50% by weight of methylene dianiline said mixture having been prepared by condensation of aniline and formaldehyde in the presence of hydrochloric acid. The mixture of reactants so obtained was mechanically blended for approximately 5–10 seconds, poured into a mold and permitted to foam freely at ambient temperatures. The resultant high temperature foam was characterized by very fine uniform cell structure and infrared absorption peaks at 5.60, 5.80, and 7.24 microns.

We claim:

1. A process for the preparation of cellular high temperature resistant condensation polymers containing an imide group in the recurring unit thereof which comprises admixing, at temperatures within the range of about 15° C. to about 50° C. and reacting, without the addition of external heat and in the presence of from about 1 percent to about 56 percent by weight, based on the total weight of all the other components of the reaction mixture, of a dipolar aprotic organic solvent selected from the class consisting of dialkylsulfoxides and N,N-dialkylalkanoamides, (a) an organic polyisocyanate, (b) a polycarboxylic acid derivative having a plurality of acid moieties selected from the class consisting of anhydride and carboxy provided that at least one of said acid moieties is anhydride, and (c) a member selected from the class consisting of a tertiary amine catalyst and an adjuvant containing at least 2 active hydrogen atoms and having an equivalent weight of from about 30 to about 3000 said polyisocyanate (a) being employed in an amount corresponding to about 0.25 to about 10 equivalents per equivalent of said polycarboxylic derivative (b) and said member (c) being present in an amount within the range of about 0.01 equivalents to about 0.50 equivalents per equivalent of polyisocyanate (a).

2. The process of claim 1 wherein the dipolar aprotic organic solvent is dimethyl sulfoxide.

3. The process of claim 1 wherein the polycarboxylic acid intramolecular anhydride is 3,3',4,4'-benzophenone tetracarboxylic dianhydride.

4. The process of claim 1 wherein the polyisocyanate is a polymethylene polyphenyl isocyanate mixture containing from about 35% to about 85% by weight of methylenebis(phenyl isocyanate) the remainder of said mixture being polymethylene polyphenyl isocyanates having a functionality higher than 2.0.

5. The process of claim 4 wherein the polymethylene polyphenyl isocyanate mixture contains from about 35% to about 60% by weight of methylenebis(phenyl isocyanate) the remainder of said mixture being polymethylene polyphenyl isocyanates having a functionality higher than 2.0.

6. The process of claim 1 wherein the polycarboxylic derivative is an aromatic polycarboxylic intramolecular anhydride having the formula:

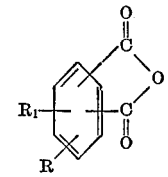

wherein $R_1$ is selected from the class consisting of carboxyl and

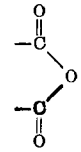

wherein the carbon atoms of the latter are each attached to adjacent carbon atoms in the aromatic ring, and R represents from 0 to 3 substituents selected from the class consisting of halogen and lower-alkyl.

7. The process of claim 1 wherein the polycarboxylic derivative is an aromatic polycarboxylic intramolecular anhydride having the formula:

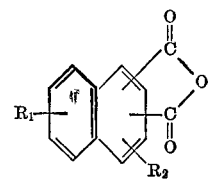

wherein at least one of $R_1$ and $R_2$ represents a group selected from the class consisting of carboxyl and the group

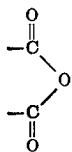

wherein the carbon atoms of the latter are each attached to adjacent carbon atoms in the aromatic ring and wherein $R_1$ and $R_2$ additionally represent from 0 to 3 substituents selected from the group consisting of halogen and lower-alkyl.

8. The process of claim 1 wherein the polycarboxylic derivative is an aromatic polycarboxylic intramolecular anhydride having the formula:

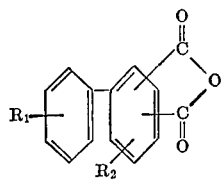

wherein at least one of $R_1$ and $R_2$ represents a group selected from the class consisting of carboxyl and the group

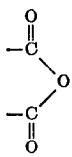

wherein the carbon atoms of the latter are each attached to adjacent carbon atoms in the aromatic ring and wherein $R_1$ and $R_2$ additionally represent from 0 to 3 substituents selected from the group consisting of halogen and lower-alkyl.

9. The process of claim 1 wherein the polycarboxylic derivative is an aromatic polycarboxylic intramolecular anhydride having the formula:

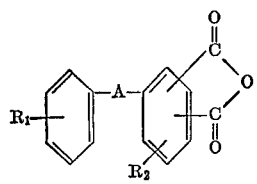

wherein at least one of $R_1$ and $R_2$ represents a group selected from the class consisting of carboxyl and the group

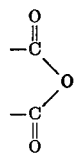

wherein the carbon atoms of the latter are each attached to adjacent carbon atoms in the aromatic ring, wherein $R_1$ and $R_2$ additionally represent from 0 to 3 substituents selected from the group consisting of halogen and lower-alkyl, and wherein A is a bridging group selected from the class consisting of lower-alkylene, carbonyl, sulfonyl, and oxygen.

10. The process of claim 1 wherein said member (c) is a polyol having an equivalent weight from about 30 to about 3000 and a functionality from 2 to 8.

11. The process of claim 1 wherein said member (c) is triethylenediamine.

References Cited

UNITED STATES PATENTS

| | | | |
|---|---|---|---|
| 3,180,854 | 4/1965 | Schneider et al. | 260—77.5 |
| 3,236,812 | 2/1966 | McElroy | 260—75 |
| 3,249,561 | 5/1966 | Hendrix | 20—2.5 |
| 3,300,420 | 1/1967 | Frey | 260—2.5 |
| 3,312,653 | 4/1967 | Pace | 260—30.8 |
| 3,317,481 | 5/1967 | Yonker | 260—77.5 |
| 3,489,696 | 1/1970 | Miller | 260—2.5 |
| 3,314,923 | 4/1967 | Muller et al. | 260—78 |
| 3,317,480 | 5/1967 | Fetscher et al. | 260—77.5 |

FOREIGN PATENTS 674,252  4/1966  Belgium _____ 260—2.5AM

OTHER REFERENCES

Kuryla et al. Jour. Appl. Polymer Science Part B pp. 651–653 (August 1965) Union Carbide Reprint.

DONALD E. CZAJA, Primary Examiner

H. S. COCKERAM, Assistant Examiner

U.S. Cl. X.R.

260—30.4, 30.6, 30.8, 31.2, 31.4, 31.6, 31.8, 32.4, 32.6, 33.2, 47, 77.5, 78